US00RE37518E

(19) United States
(12) Reissued Patent
Hardigg et al.

(10) Patent Number: US RE37,518 E
(45) Date of Reissued Patent: Jan. 22, 2002

(54) LIGHTWEIGHT HANDLE

(75) Inventors: James S. Hardigg, Conway; Rene R. Aponte, Chicopee, both of MA (US)

(73) Assignee: Hardigg Industries, Inc., South Deerfield, MA (US)

(21) Appl. No.: 08/962,111

(22) Filed: Oct. 31, 1997

Related U.S. Patent Documents

Reissue of:
(64) Patent No.: 5,461,755
Issued: Oct. 31, 1995
Appl. No.: 08/155,806
Filed: Nov. 23, 1993

(51) Int. Cl.[7] ..... B65D 25/28
(52) U.S. Cl. ..... 16/438; 16/444; 220/759; 220/763; 220/765
(58) Field of Search ..... 16/112, 126, 438, 16/425, 445, 439, 424; 220/759, 763, 765, 766

(56) References Cited

U.S. PATENT DOCUMENTS

| | | | | | |
|---|---|---|---|---|---|
| 530,814 | A | * | 12/1894 | Woodard | 16/112 |
| 617,103 | A | * | 1/1899 | Klein | 16/439 |
| 630,886 | A | | 8/1899 | Held | 16/126 |
| 1,427,603 | A | * | 8/1922 | Kallmeyer | 16/439 |
| 1,465,701 | A | * | 8/1923 | Whartenby | 16/439 |
| 2,088,476 | A | | 7/1937 | Kemper | 16/112 |
| 2,401,399 | A | | 6/1946 | Akers | 16/126 |
| 2,436,598 | A | | 2/1948 | Pastor et al. | 16/112 |
| 3,204,286 | A | * | 9/1965 | Hillenbrand | 16/112 |
| 3,248,750 | A | | 5/1966 | Black | 16/126 |
| 3,464,586 | A | | 9/1969 | Hitzeroth | 220/94 |
| 3,699,611 | A | | 10/1972 | Johnson | 16/424 |
| 3,804,290 | A | * | 4/1974 | Billman | 220/765 |
| 3,924,775 | A | | 12/1975 | Andreaggi et al. | 220/96 |
| 4,068,347 | A | * | 1/1978 | Johnson et al. | 16/112 |
| 4,157,763 | A | | 6/1979 | Betlejewski et al. | |
| 4,196,821 | A | | 4/1980 | Teti, Jr. et al. | 220/94 |
| 4,223,421 | A | | 9/1980 | Wassenaar | 16/126 |
| 4,284,202 | A | | 8/1981 | Barstow, Jr. | 220/4 |
| 4,544,050 | A | | 10/1985 | Seynhaeve | 16/126 |
| 4,775,072 | A | * | 10/1988 | Lundblade | 16/112 |
| 5,012,553 | A | | 5/1991 | Hardigg et al. | 16/126 |
| 5,042,676 | A | | 8/1991 | Gohlke | 220/766 |
| 5,226,553 | A | | 7/1993 | Fiore | 220/318 |
| 5,463,800 | A | * | 11/1995 | Rojder | 16/438 |

* cited by examiner

*Primary Examiner*—Anthony Knight
(74) *Attorney, Agent, or Firm*—McCormick, Paulding & Huber LLP

(57) ABSTRACT

Disclosed is a light weight handle assembly adapted to transport a heavy duty container which may contain sensitive electronic components. The handle assembly of the present invention generally comprises a stationary bracket which mounts to a container wall and a movable handle pivotally connected to the bracket. The bracket is formed with an inner portion that is adapted to rotatably engage with a pair of pivoting arms extending from the movable handle so that the light weight handle may easily be assembled and disassembled. The stationary bracket is also formed with two stationary stop members while each of the pivoting arms are formed with a corresponding movable stop member. The stationary stop members and movable stop members each have a substantially planar contact surface which are designed such that when the movable handle is pivoted to the lifting/operative position, the movable stop members are in contact with the stationary stop members with less stress in the materials than in conventional handles. The lower stresses enable a strong handle to be made of plastic material such as polyethylene.

11 Claims, 2 Drawing Sheets

LIGHTWEIGHT HANDLE

Matter enclosed in heavy brackets [ ] appears in the original patent but forms no part of this reissue specification; matter printed in italics indicates the additions made by reissue.

FIELD OF THE INVENTION

The present invention relates generally to handles and more particularly to lightweight handles for lifting and transporting heavy-duty containers.

BACKGROUND OF THE INVENTION

The use of handles for lifting and transporting various objects is well known. For certain applications, it is desirable to use a handle that is light in weight, yet provides a stable and durable mechanism for lifting heavy objects. This is particularly true in the case of roto-molded plastic containers which are designed for the transport and handling of instruments and electronic equipment in hazardous environments such as those typically found in military, geophysical and news service applications.

In the above application, the weight and size of loaded containers necessitate that two or more handles be distributed about the outside of the containers. Said handles are normally required to lie flat against the sides of the containers when not in use. When the container is being carried by the handles, however, the handles are required to stop with their bales perpendicular to the container wall so that the fingers of people lifting the container are not compressed between the handle bales and the walls of the container. Such a handle needs to be capable of lifting heavy-duty containers in the normal upward direction while experiencing heavy side loads and outward pulls. It is also desirable that the handle be capable of quick assembly during commercial production and/or disassembly to replace parts at the customer's site.

A handle developed by the applicants of the present invention is shown in U.S. Pat. No. 5,012,533. Handles of this type, although providing the required strength with less weight than prior conventional handles, are not without their drawbacks. First, the metal bale requires precise bending in two directions and must be heat-treated. For strength and economy, high carbon steel is used which must be plated. Finally, as many as twelve parts must be assembled to make the final handle. Although the performance of such handles is good and achieved at low weight, the cost of manufacture is relatively high.

SUMMARY OF THE INVENTION

One object of the present invention is to provide a handle assembly which substantially eliminates any relative movement between the handle and the container during transportation.

A second object of the present invention is to provide a handle assembly that is easy to assemble and disassemble thereby increasing production efficiency.

A third object of the present invention is to provide a strong, light handle that will not corrode nor be weakened by chemical attack.

Another object of the present invention is to provide a handle which is more durable and reliable thereby increasing the effective life span of the handle.

The above objects are realized by the present invention which is a light weight handle assembly adapted so that a user can stably lift and transport a heavy-duty container. In one embodiment, the handle assembly generally comprises a stationary bracket that mounts to a container wall and a movable handle which is pivotally connected to the bracket. In operation, when the stationary bracket is attached to the container wall, the movable handle may be pivoted between an inoperative position and an operative position. When the stationary bracket is removed or unattached from the container wall, the movable handle may be pivoted to a disengaged position where it may be easily assembled to or unassembled from the stationary bracket. This latter feature provides a handle assembly that is compatible with high production environments and which can be manufactured from a small amount of components.

The stationary bracket is also formed with two stationary stop members. Similarly, the movable handle is formed with two movable stop members. The stationary and movable stop members have substantially planar contact surfaces that are adapted so that when the movable handle is pivoted to its operative position, the movable stop members are in substantial stable contact with the stationary stop members.

BRIEF DESCRIPTION OF THE DRAWINGS

The following detailed description will become better understood with reference to the accompanying drawings in which.

DETAILED DESCRIPTION OF THE PREFERRED EMBODIMENT

Figure 2:
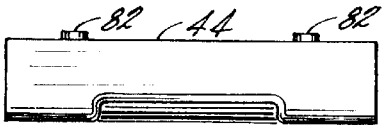
FIG. 2 is a top view of the present invention.
Figure 1:
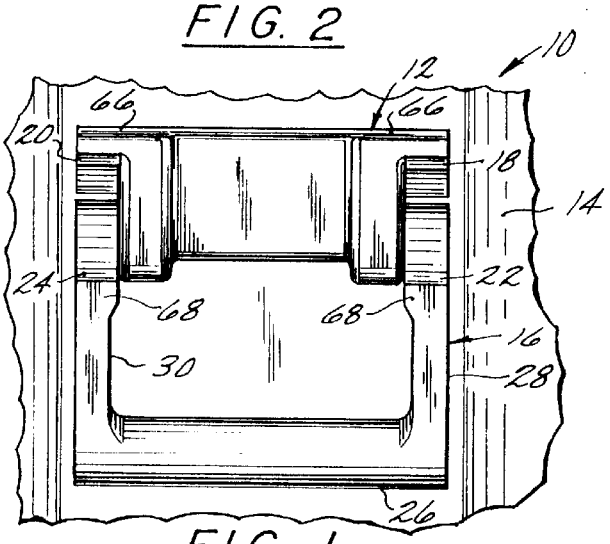
FIG. 1 is a front view showing the light weight handle assembly of the present invention mounted to a container.
Figure 5:
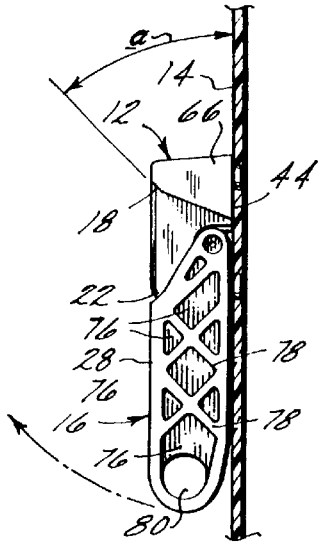
FIG. 5 is a side view showing the light weight handle assembly of the present invention in an inoperative position.
Figure 3:
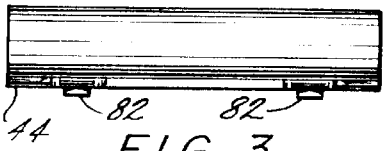
FIG. 3 is a bottom view of the present invention.
Figure 6:
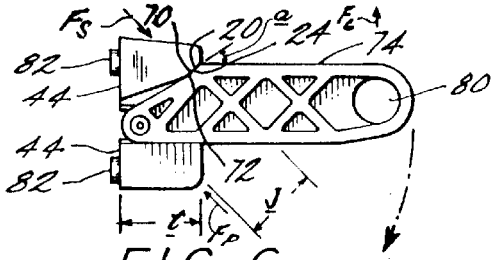
FIG. 6 is a side view showing the light weight handle assembly of the present invention in an operative position.

Referring to FIG. 1, the light weight handle assembly 10 according to the present invention is shown. The handle assembly 10 generally comprises a stationary bracket 12 mounted to a container wall 14 which may be a wall of a roto-molded container or any other container used to carry objects such as sensitive electronic equipment. The handle assembly 10 further comprises a movable handle 16 which is pivotally connected to the stationary bracket 12. When the stationary bracket 12 is connected to the container wall 14, the movable handle 16 may be pivoted between an inoperative position (FIG. 5) and an operative position (FIG. 6). When the stationary bracket 12 is not attached to or is removed from the container wall 14, the movable handle 16 may be pivoted to a disengaged position (FIG. 7) wherein the movable handle 16 may be easily assembled to or disassembled from the stationary bracket 12. This feature of the present invention allows the handle assembly 10 to be quickly assembled, thereby increasing production efficiency.

To stabilize the handle assembly 10 while the container is being carried by the handle, the stationary bracket 12 is provided with stationary stop members 18 and 20 while the movable handle 16 is provided with movable stop members 22 and 24. The movable stop members 22 and 24 and the stationary stop members 18 and 20 are adapted to engage with each other to thereby limit the pivotal movement of the movable handle 16 between its inoperative position (FIG. 5) and its operative position (FIG. 6). As will be described more fully herein, both the stationary stop members 18 and 20 and the movable stop members 22 and 24 are provided with substantially planar contact surfaces which increases the effective contact area and reduces the compressive stress in the stop members.

Figure 4:
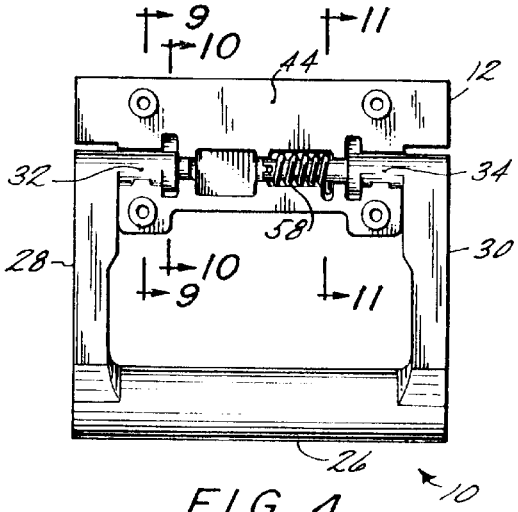
FIG. 4 is a rear view of the present invention.
Figure 9:
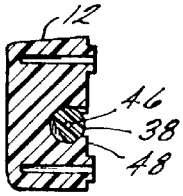
FIG. 9 is a cross-section view taken along line 9—9 of FIG. 4.
Figure 10:
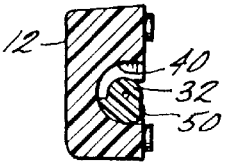
FIG. 10 is a cross-section view taken along line 10—10 of FIG. 4.
Figure 11:
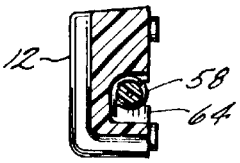
FIG. 11 is a cross-section view taken along line 11—11 of FIG. 4 showing a view of the spring attachment portion of the present invention; and, FIG. 12 is a rear perspective view of the stationary bracket.
Figure 8:
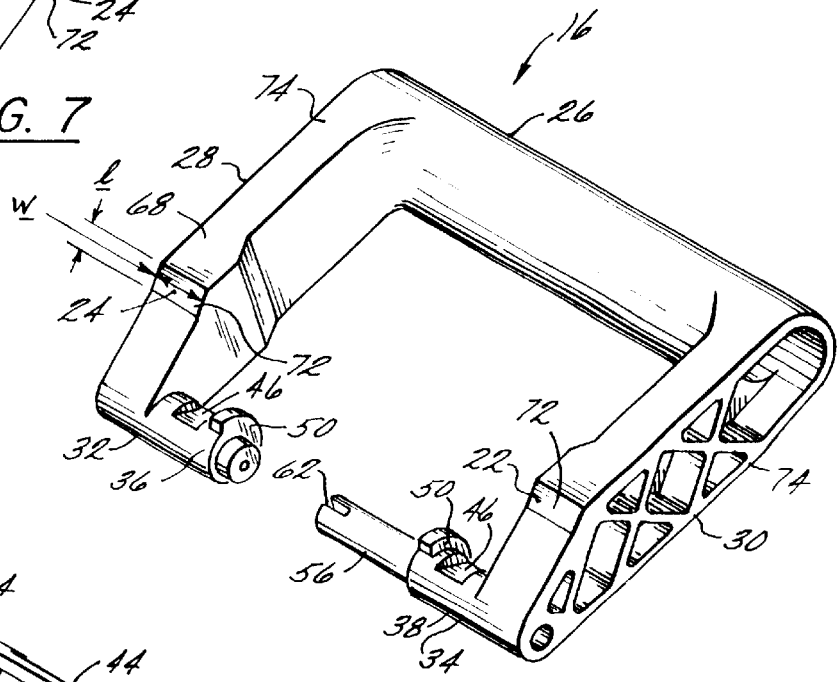
FIG. 8 is a perspective view of the movable handle of the present invention.

Referring to FIGS. 1 and 8, the movable handle 16 comprises a hand gripping portion 26 adapted to be comfortably grasped by a user's hand. The movable handle 16 further comprises a pair of pivoting arms 28 and 30 that extend from the hand gripping portion 26 and which are generally parallel to each other. As best shown by FIGS. 4 and 8, the movable handle 16 further comprises rotating pivot portions 32 and 34 which extend from the distal end of the pivoting arms 28 and 30, respectively and which are generally disposed parallel to the hand gripping portion 26.

With reference to FIG. 8, the rotating pivot portions 32 and 34 comprise cylindrical portions 36 and 38, respectively, which are adapted to freely rotate within a corresponding cylindrical shaped cavity portions 40 and 42 extending inward from a rear surface 44 of the stationary bracket 12. Cylindrical portions 36 and 38 are captured within the first and second cavity portions 40 and 42 by means of a retainer 48 formed at the upper portion of the cavity portions 40 and 42. When the movable handle 16 is in its operative position (FIG. 6), the cylindrical portions 36 and 38 are in bearing contact with their corresponding cavity portions 40 and 42.

With continued reference to FIG. 8, each of the rotating pivot portions 32 and 34 further comprise a key-way or recess 46 which is adapted such that when the movable handle 16 is pivoted to its disengaged position (FIG. 7), the key-ways 46 are in substantial alignment with the retainers 48. In this disengaged position, the cylindrical portions 36 and 38 of rotating pivot portions 32 and 34 may be easily assembled to or disassembled from cavity portions 40 and 42 of the stationary bracket 12.

Still referring to FIG. 8, each of the rotating pivot portions 32 and 34 further comprise a semi-circular shaped flange portion 50 protruding from respective ends of the cylindrical portions 36 and 38 which are adapted to freely rotate within corresponding cylindrical shaped cavity portions 52 which extend inward from the rear surface 44 of the stationary bracket 12. When the flange portions 50 are disposed within the cavity portions 52, the axial movement of the cylindrical portions 36 and 38 and therefore the movable member is limited.

The rotating pivot portion 34 further comprises a spring support portion 56 disposed adjacent to and extending from the cylindrical portion 38. The spring support portion 56 is of generally cylindrical shape and is adapted to receive a torsion spring 58 (FIG. 4). The spring support portion 56 is rotatable within a spring attachment cavity portion 60 extending inward from the rear surface 44 of the stationary bracket 12. The spring support portion 56 comprises a groove 62 that is adapted to secure one end of the torsion spring 58. The other end of the torsion spring 58 is secured within a channel 64 formed adjacent to the cavity portion 60.

Figure 7:
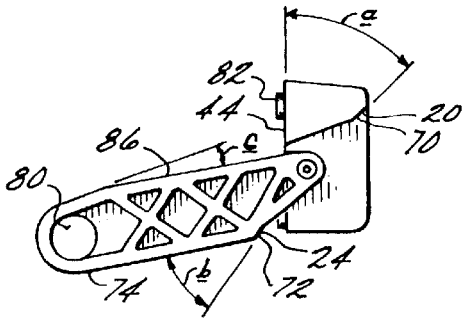
FIG. 7 is a side view showing the light weight handle assembly of the present invention in a disengaged position.

The stationary stop members 18 and 20 are formed on an outside portion 66 of the stationary bracket 12 while the movable stop members 22 and 24 are formed on an outside portion 68 of the pivoting arms 28 and 30. As best shown by FIGS. 5 and 7, the stationary stop members 18 and 20 are each formed with a substantially planar contact surface 70 which is off-set an angle a to the container wall 14 and/or the rear surface 44 of the stationary bracket 12. In the preferred embodiment, the angle a is about 45 degrees. Similarly, and as best shown by FIG. 7, the movable stop members 22 and 24 are each formed with a substantially planar contact surface 72 which is off-set an angle b from a top surface 74 of the pivoting arms 28 and 30. In the preferred embodiment, the angle b is about 45 degrees. In operation, when the movable handle 16 is pivoted from its inoperative position (FIG. 5) to its operative/lifting position (FIG. 6), the movable stop members 22 and 24 are brought into substantial contact with the stationary stop members 18 and 20. As such, the pivotal movement of the movable handle 16 between its inoperative position (FIG. 5) and its operative position (FIG. 6) is about 90 degrees. Furthermore, the planar contour of the contact surfaces reduces the relative movement between the movable handle 16 and the container. The surface area of the contact surfaces 70 and 72 is defined by a length l and a width w. This contact surface area provides for increased stability of the handle assembly 10 when the movable handle 16 is pivoted to its operative/lifting position (FIG. 6) by reducing the shear forces and relative movement between the movable handle 16 and the container.

Figure 12:
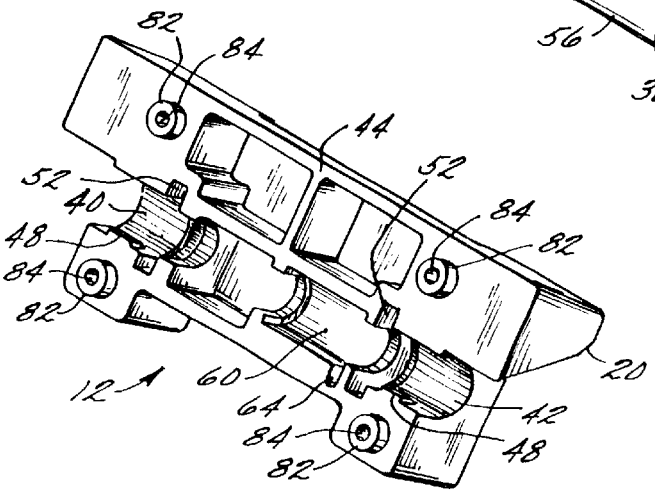

As best shown by FIG. 12, the stationary bracket 12 also comprises a plurality of mounting lugs or bosses 82 disposed on the rear surface 44. In the preferred embodiment, the mounting lugs or bosses 82 extend from the rear surface 44 and provide shear strength between the bracket 12 and the container wall 14. In this regard, the hand gripping portion 26 of the movable handle 16 may be upwardly displaced an angle c from a bottom surface 86 of the pivoting arms 28 and 30 to thereby facilitate initial grasping of the hand gripping portion 26. In the preferred embodiment, the angle c is about 10 degrees. The mounting lugs 82 may further comprise openings 84 adapted to receive a suitable fastener such as a self-tapping screw and the like. Such fasteners are loaded in tension only, and sealing against air passage is accomplished by the employment of rubber-faced washers under the heads of the fasteners.

The stress-lowering improvements of the handle of the present invention may best be demonstrated with reference to FIG. 6. As shown, the handle 16 is placed in its operative/lifting position by an upward force $F_L$ applied to the hand gripping portion 26. As said handle 16 has two pivoting arms 28, the upward force on each arm 28 is $F_L/2$. Upward rotation beyond 90° is prevented by a compressive stop force $F_s$ in the contact area between the movable and stationary stop members 22 and 24 and 18 and 20 respectively, and a shear force in the pivot $F_P$. For a specific magnitude of $F_L$, the stop force $F_s$ is inversely proportional to the moment arm J. Thus, to minimize $F_s$, the moment arm J must be as large as possible. This is controlled by the thickness t of the bracket 12 and the diameter of the pivot portions 32 and 34. When the thickness of the bracket 12 and the handle 16 are approximately the same, the moment arm J will be maximized when the angle of the plane between the axis of the pivot portions 32 and 34 and the stop areas 18,

20, 22 and 24 is 45° relative to the horizontal. In the preferred embodiment where said angle is 45°, said moment arm J is approximately 1.5 times greater than when contact between the movable stop members and stationary stop members is horizontal. Thus, for the same lifting force $F_L$, the compressive stress in the stop member area of the handle 16 is approximately 33% less. This stress-lowering improvement in the handle 16 makes it possible to produce said handle from polyethylene and the like.

As will be clear to those skilled in the art, a change in the ratio of bracket thickness to handle thickness will dictate a change in the angle for maximizing the moment arm J.

The stationary bracket 12 and the movable handle 16 may be made from a variety of materials, including but not limited to, polyethylene or any high strength thermoplastic material. To realize additional weight reduction and to reduce material costs and molding time, material from the stationary bracket 12 and the movable handle 16 may removed in various places without significantly reducing the load/strength requirements of the components. By way of example only, the pivoting arms 28 and 30 may be formed with cut-outs 76 (FIG. 5) which eliminate a large amount of material and ribs 78 may be formed to maintain the strength requirements. Similarly, the hand gripping portion 26 may be formed with a hollow inner portion 80 thereby also reducing a significant amount of material.

Except for the torsion spring 58 and mounting bolts (not shown), all of features of the handle assembly 10 heretofore described are formed integral to either the stationary bracket 12 or the movable handle 16. This feature provides a handle assembly 10 that is compatible with high production environments and which is reliable and durable. The stationary bracket 12 and the movable handle 16 may be manufactured by conventional molding processes suitable for use with thermoplastic materials.

The foregoing description is intended primarily for purposes of illustration. This invention may be embodied in other forms or carried out in other ways without departing from the spirit or scope of the invention. Modifications and variations still falling within the spirit or the scope of the invention will be readily apparent to those of skill in the art.

What is claimed is:

1. A handle assembly disposed on a container wall for lifting and transporting said container, the handle assembly comprising:

a stationary bracket member affixed to the container wall, said bracket member having inner and outer portions;

a movable handle member comprising a hand grip portion and first and second arms extending from said hand grip portion, each of said first and second arms including an outer portion and a pivot portion substantially parallel to said hand grip portion, each of said pivot portions being rotatable within said inner portion of said stationary bracket member so that said movable handle member may be pivoted between a first position and a second position;

first and second stationary stop members disposed on the outer portion of said stationary bracket member; [and]

first and second movable stop members disposed on the outer portion of said first and second arms of said movable handle;

each of said stationary stop members and movable stop members having a substantially planar contact surface which come into contact when said movable handle is pivoted from its first position to its second position so as to limit said pivotal movement of said movable handle; *and* said planar contact surfaces of said movable handle and said stationary bracket being disposed at an angle of about 45 degrees with respect to the container wall when in contact with one another whereby said movable handle is positioned *such that said arms thereof are at an angle of* approximately 90 degrees with respect to said container wall.

2. The handle assembly of claim 1, wherein said inner portion of said stationary bracket member includes first and second retainer members for retaining said first and second pivot portions of said movable handle member.

3. The handle assembly of claim 1, wherein said each of said pivot portions of said movable handle member further includes a cylindrical portion adapted to rotate within said inner portion of said stationary bracket member.

4. [The handle assembly of claim 3,] *A handle assembly disposed on a container wall for lifting and transporting said container, the handle assembly comprising:*

*a stationary bracket member affixed to the container wall, said bracket member having inner and outer portions;*

*a movable handle member comprising a hand grip portion and first and second arms extending from said hand grip portion, each of said first and second arms including an outer portion and a pivot portion substantially parallel to said hand grip portion, each of said pivot portions being rotatable within said inner portion of said stationary bracket member so that said movable handle member may be pivoted between a first position and a second position;*

*first and second stationary stop members disposed on the outer portion of said stationary bracket member;*

*first and second movable stop members disposed on the outer portion of said first and second arms of said movable handle;*

*each of said stationary stop members and movable stop members having a substantially planar contact surface which come into contact when said movable handle is pivoted from its first position to its second position so as to limit said pivotal movement of said movable handle;*

*said planar contact surfaces of said movable handle and said stationary bracket being disposed at an angle of about 45 degrees with respect to the container wall when in contact with one another whereby said movable handle is positioned such that said arms thereof are at an angle of approximately 90 degrees with respect to said container wall;*

*wherein said each of said pivot portions of said movable handle member further includes a cylindrical portion adapted to rotate within said inner portion of said stationary bracket member; and* wherein each of said pivot portions of said movable handle member further includes a flange portion extending outwardly from said cylindrical portion so as to limit the axial movement of said pivot portion within said inner portion of said stationary bracket member.

5. The handle assembly of claim 4, wherein said first pivot portion further includes a spring support member axially disposed with said cylindrical portion and a torsion spring member disposed thereon, said spring support member having a spring attachment portion for securing one end of said torsion spring, said other end of said torsion spring being attached to said stationery bracket member.

6. The handle assembly of claim 5, wherein said inner portion of said stationary bracket member comprises a first cavity for rotatably receiving said first pivot portion of said first arm and a second cavity for rotatably receiving said second pivot portion of said second arm, said first retainer member being disposed in said first cavity and said second retainer being disposed in said second cavity.

7. The handle assembly of claim 6, wherein said inner portion of said stationary bracket member further includes a third cavity for receiving said flange portion of said first pivot portion of said first arm and a fourth cavity for receiving said flange portion of said second pivot portion of said second arm.

*8. A handle assembly for lifting a container and constructed to reduce stress in the handle assembly, comprising:*

*a) stationary stop members connected with said container;*

*b) a bracket having an axial opening, said bracket being mountable on a wall of said container;*

*c) a hand grip assembly including a hand grip portion and two extension portions extending from both ends of said hand grip portion, said two extension portions each extending generally perpendicularly to said hand grip portion and in the same direction as one another, said two extension portions each having stop members thereon, said portions being adapted to simultaneously engage said bracket in a hinged relationship such that said hand grip assembly is pivotable from an inoperative position to an operative position wherein said stop members upon said two extensions contact said stationary stop members on said container at about a 45° angle to said wall upon which said handle assembly is mounted and said extension portions are at an angle of approximately 90 degrees to said container wall.*

*9. A handle assembly as claimed in claim 8 wherein when said handle assembly is unattached to said container, said hand grip assembly is disengageable from said bracket.*

*10. A handle assembly disposed on a container wall for lifting and transporting said container, the handle assembly comprising:*

*a stationary bracket member affixed to the container wall, said bracket member having inner and outer portions;*

*a movable handle member comprising a hand grip portion and first and second arms extending from said hand grip portion, each of said first and second arms including an outer portion and a pivot portion substantially parallel to said hand grip portion, each of said pivot portions being rotatable within said inner portion of said stationary bracket member so that said movable handle member may be pivoted between a first position and a second position;*

*first and second stationary stop members located to be contacted by first and second movable stop members disposed on the outer portion of said first and second arms of said movable handle;*

*each of said stationary stop members and movable stop members having a substantially planar contact surface which come into contact when said movable handle is pivoted from its first position to its second position so as to limit said pivotal movement of said movable handle;*

*said planar contact surfaces of said movable handle and said stationary stop members being disposed at an angle of about 45 degrees with respect to the container wall when in contact with one another whereby said movable handle is positioned such that said arms thereof are at an angle of approximately 90 degrees with respect to said container wall.*

*11. A handle assembly disposed on a container wall for lifting and transporting said container, the handle assembly comprising:*

*a stationary bracket member affixed to the container wall, said bracket member having inner and outer portions;*

*a movable handle member comprising a hand grip portion and first and second arms extending from said hand grip portion, each of said first and second arms including an outer portion and a pivot portion substantially parallel to said hand grip portion, each of said pivot portions being rotatable within said inner portion of said stationary bracket member so that said movable handle member may be pivoted between a first position and a second position;*

*first and second stationary stop members on said container;*

*first and second movable stop members disposed on the outer portion of said first and second arms of said movable handle;*

*each of said stationary stop members and movable stop members having a substantially planar contact surface which come into contact when said movable handle is pivoted from its first position to its second position so as to limit said pivotal movement of said movable handle, said planar contact surfaces of said movable handle and stationary stop members being disposed at an angle of about 45 degrees with respect to the container wall when in contact with one another whereby said movable handle is positioned such that said arms thereof are at an angle of approximately 90 degrees with respect to said container wall; and*

*said bracket and said moveable handle being substantially hollowed in predetermined locations whereby weight and material are reduced and strength is maintained.*

* * * * *